Jan. 5, 1965   H. FELDMANN ETAL   3,164,037
INDEXING DEVICE
Filed Sept. 8, 1961   4 Sheets-Sheet 1

INVENTOR
HEINZ FELDMANN
GUILLEAUME SCHAMING

Jan. 5, 1965   H. FELDMANN ETAL   3,164,037
INDEXING DEVICE
Filed Sept. 8, 1961   4 Sheets-Sheet 2

INVENTOR
HEINZ FELDMANN
GUILLEAUME SCHAMING
By: McGlew and Toren,
Attorneys

Jan. 5, 1965  H. FELDMANN ETAL  3,164,037
INDEXING DEVICE

Filed Sept. 8, 1961  4 Sheets-Sheet 3

INVENTORS
HEINZ FELDMANN
GUILLEAUME SCHAMING
By: McGlew and Toren,
attorneys

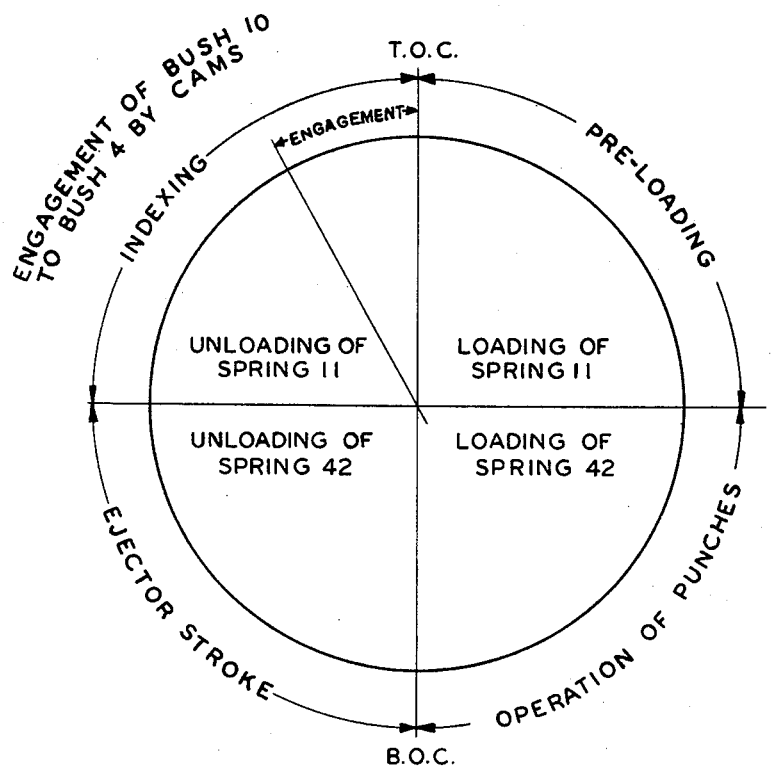

United States Patent Office 3,164,037
Patented Jan. 5, 1965

3,164,037
INDEXING DEVICE
Heinz Feldmann, Weingarten-Wurttemberg, Germany, and Guilleaume Schaming, Le Perreux, France, assignors to Caltexa Trust, Vaduz, Liechtenstein
Filed Sept. 8, 1961, Ser. No. 136,827
Claims priority, application Germany, Sept. 8, 1960, C 22,304
8 Claims. (Cl. 74—826)

This invention relates in general to indexing devices and in particular to a new and useful device for the progressive indexing of a rotatable part, such as a workpiece holding turret plate for apparatus such as a multiple die press.

The invention has particular application in respect to the advancing of workpieces through an operating cycle for operation thereon by multiple dies of a press mechanism. The invention broadly provides means for progressively indexing a member such as an indexing turret plate or turntable. In connection with a multiple die press, the indexing is accomplished to permit the follow-up operations by tools to effect a desired overall work operation on the various workpieces. In operating multiple die presses, particularly for the production of nuts and screws in which forming operations, for example, cropping a bar or wire, pre-forming such as upsetting, cold forging, punching, de-burring, etc. it is necessary to carry out such operations in a fixed sequence. In the interest of efficient production and of neatly grouped compact construction of a multiple die press, it has been proposed that the tools such as dies required for forming the workpieces or blanks be arranged on a turntable or turret plate which is successively indexed after each operation. The workpieces are thus transferred from one operating stage to another at each partial rotation or indexing movement. Prior to the present invention, indexing of a turret plate of this character was effected mainly by a Geneva mechanism which in turn was driven from the main shaft of the machine through suitable power transmission elements, such as disc cams, rod linkages or other machine elements. A drive of this type is of very complicated construction and is very costly.

In accordance with the present invention, there is provided a simple indexing mechanism which is operated by the reciprocating movement of a member such as a punch die for effecting controlled indexing of a member such as a turret plate for holding the various workpieces. The mechanism includes a member which is reciprocated during the reciprocation of the operating part of the machinery and is effective during a portion of its movement in one direction to effect the indexing movement of the workpiece holding member or turret plate. Means are provided to lock the turret plate in the index position after each indexing movement. The indexing movement is carried out in synchrony with the movement of the operating part of the machine such as the die press, and means are provided to ensure that the indexing is always complete and accurate.

A feature of the invention is the drive mechanism for indexing the member, such as the turret plate. The drive consists of an indexing sleeve or bushing which is reciprocated by a ram driven from the operating machine, and which is engageable with a similar driven bushing directly connected to the turret plate to drive the latter through helical gearing on each of the parts. The gearing is arranged to mesh during a portion of the reciprocatable movement of the indexing bush which is caused by the movement of the ram or punch. The helical gearing advantageously includes an internal helical gear formed on the sleeve coupled to the turret plate and an external helical gear formed on the indexing bushing. The length of the helical gearing determines the magnitude of partial rotation of the turret plate during each reciprocating movement of the indexing bushing in accordance with the movement of the punch.

A feature of the construction is that the drive is equipped with an electrically controlled safety device which ensures that the main machine drive is switched off automatically if the turret plate is indexed to a position out of alignment with the operating tools, such as the multiple die presses. The arrangement is such that when the indexing is completed, a locking ratchet and pawl arrangement is provided which is effective upon completion of the indexing movement to lock the turret plate in position. The locking device operates in conjunction with an electrical contact control system which is arranged to stop the machine as described previously in the event that the pawl is not properly engaged with the ratchet at each indexing step.

Accordingly, it is an object of this invention to provide an improved indexing device.

A further object of the invention is to provide an indexing device including a reciprocating member for indexing a rotatable member and including helical drive means for effecting an indexing of the rotatable member during each reciprocation of the reciprocating member.

A further object of the invention is to provide an indexing mechanism adapted to be used in association with a vertically reciprocatable operating device such as a die press, including a bushing which is adapted to be disposed for reciprocating movement in response to movement of a movable member of the die press, and including a rotatable turret plate for holding workpieces in the die plate which is operatively rotated through an indexing angle by the reciprocation of the indexing bushing.

A further object of the invention is to provide an indexing mechanism for a machine having a reciprocating part such as a die press, including an indexing sleeve biased into an upward position into contact with a driving sleeve member which in turn is biased into a downward position and held by the movable portion of the machine, and wherein the driving sleeve is effective to move the indexing sleeve downwardly to compress its biasing means, the sleeve being effective upon an upward movement of the reciprocating member of the machine to rotate the turret plate through helical gearing to effect the indexing thereof.

A further object of the invention is to provide an indexing device having control means for discontinuing the operation of the machine in the event that the indexing is not carried out to the prescribed angular movement.

A further object of the invention is to provide an indexing device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 7 is an indexing diagram of the method of operation of the drive for the turret plate or turntable during a partial rotation or indexing movement.

Figure 1:
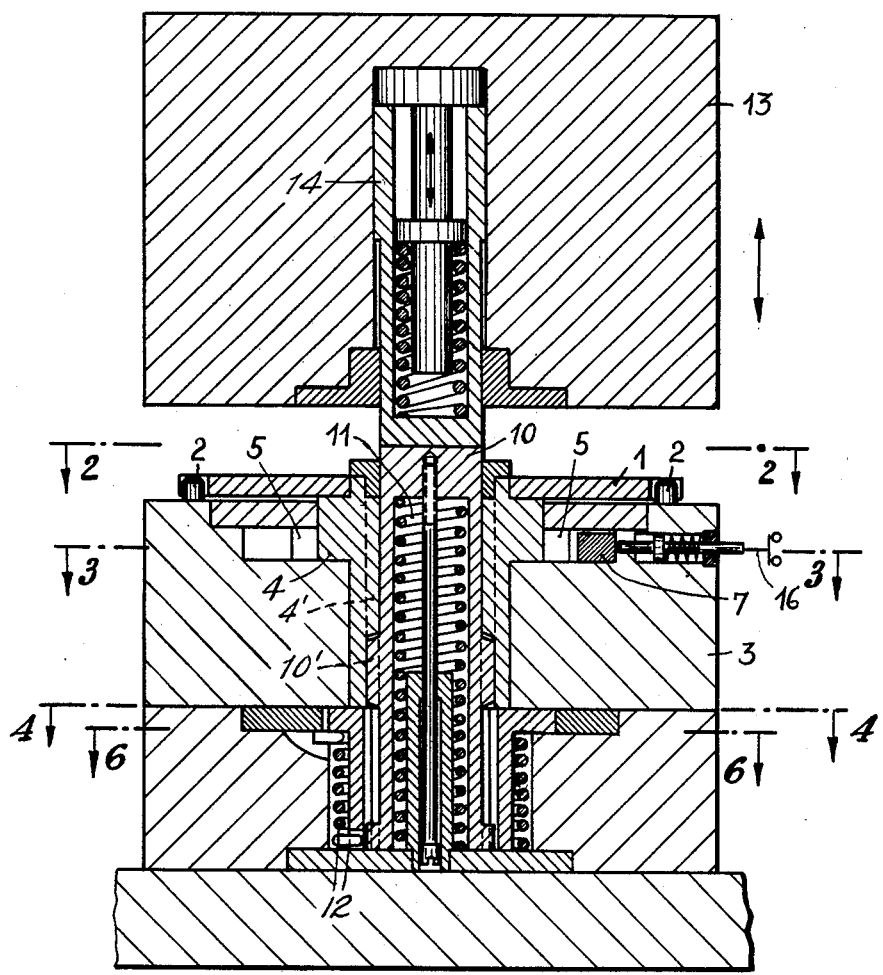
FIG. 1 is a transverse section through the turret plate drive of a multiple die press having an indexing mechanism constructed in accordance with the invention and shown with the ram at its bottom dead center position.
Figure 2:
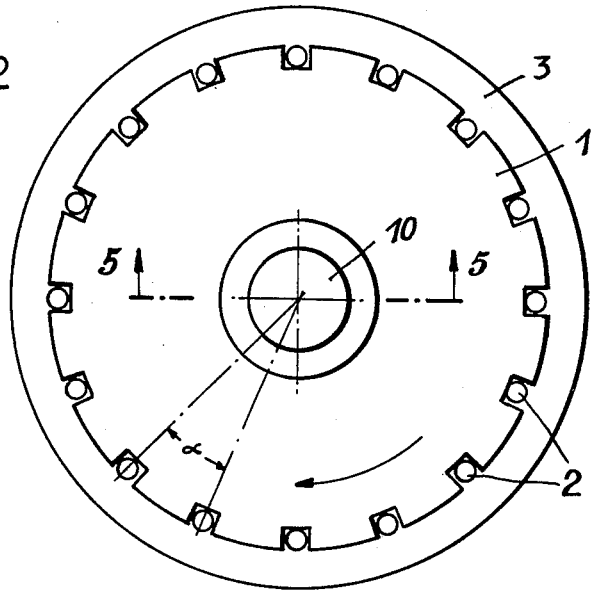
FIG. 2 is a horizontal section taken on the line 2—2 of FIG. 1.

Referring to the drawings in particular, the invention embodied therein includes an indexing mechanism for rotating a turret plate or workpiece holding disc 1 through a prescribed angle for effecting various die press operations on workpieces 2 in a multiple die press generally designated 30. In the embodiment indicated, the workpieces 2 are blanks which are formed as cut off pieces from a bar stock. A plurality of individual die press tools (not shown) are arranged on a circular arc at regular spacings which correspond to the indexing travel, that is, a partial arcuate rotative movement of the turret plate 1 as indicated by the angle α in the drawing.

The press 30 includes a table 3 supported on a mounting stand 34 which is journaled to rotatably receive a driven sleeve or bushing member 4 which is directly connected at the center to the turret plate 1. The bushing 4 is provided with gear teeth 5 at its periphery at the upper end thereof which are engaged at each indexing station by a ratchet lever 7 of arcuate outline which is disposed between the upper gear tooth portion of the sleeve 4 and a recessed portion formed in the table 3 (see FIG. 3). The lever 7 is arranged to pivot about an upstanding pivot pin 6 which is secured to the table 3. A leaf spring 9 is arranged to bias the ratchet end 8 of the lever 7 into engagement between teeth 5 of the sleeve 4.

Figure 3:
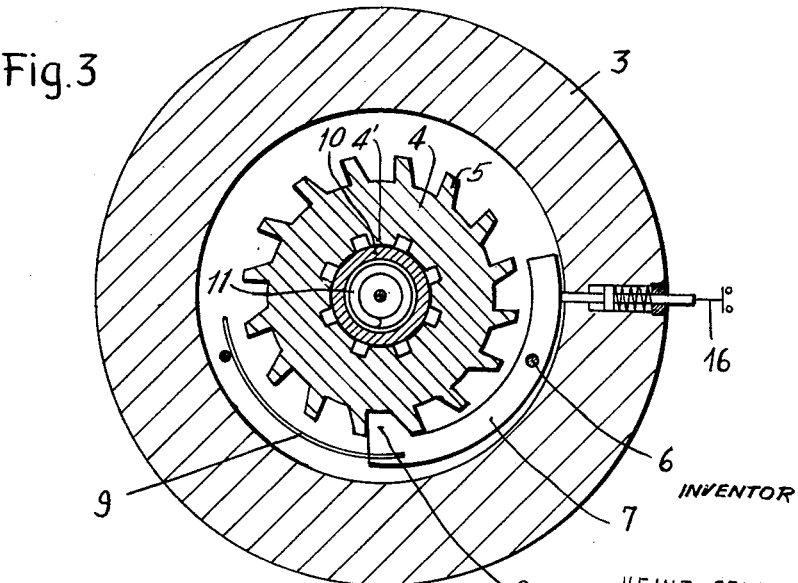
FIG. 3 is a horizontal section taken on the line 3—3 of FIG. 1.

In the usual manner of ratchet and pawl mechanisms, the pawl and ratchet combination 5–7–8 is arranged to provide for rotation of sleeve 4 relative to table 3 in one direction while preventing rotation of sleeve 4 relative to table 3 in the reverse direction. Referring to FIG. 3, the pawl and ratchet combination 5–7–8 allows rotation of sleeve 4, relative to table 3, in a clockwise direction while preventing rotation of sleeve 4 in the reverse direction. For this purpose, the end 8 of pawl 7 and the teeth 5 may be formed cooperatively to permit relatively easy disengagement of end 8 of pawl 7 from teeth 5 when a force tends to turn sleeve 4 in one direction, such as clockwise. For example, inclined surfaces may be formed on the inner edge of the end 8 of pawl 7, or on the corresponding faces of teeth 5 engaged by this inner end, or on both.

Figure 5:
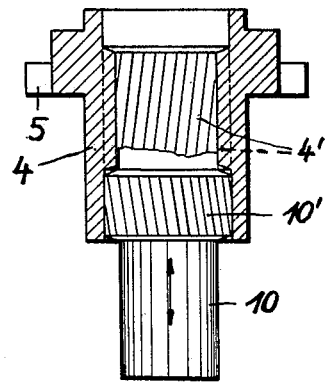
FIG. 5 is a vertical section taken on the line 5—5 of FIG. 2.

In accordance with the invention, the driven bushing or sleeve 4 is provided with internal helical gearing 4' (FIG. 5) which, during a portion of its operating cycle, engages with external gear teeth 10' of a reciprocatable indexing sleeve or bushing 10. The gearing 10 is formed as an external helical gear having a relatively short axial length and located intermediate the height of the bushing 10, whereas the internal gearing 4' of the bushing 4 is located in an axially extending area adjacent the upper end thereof.

The indexing sleeve member 10 is hollow and is provided at its interior with a coiled compression spring 11 which is disposed around an upstanding guide member 36 secured to the mounting base 34. The compression spring 11 tends to urge indexing sleeve 10 upwardly in a direction toward meshing engagement of the gear teeth 10' with the gear teeth 4'.

Figure 4:
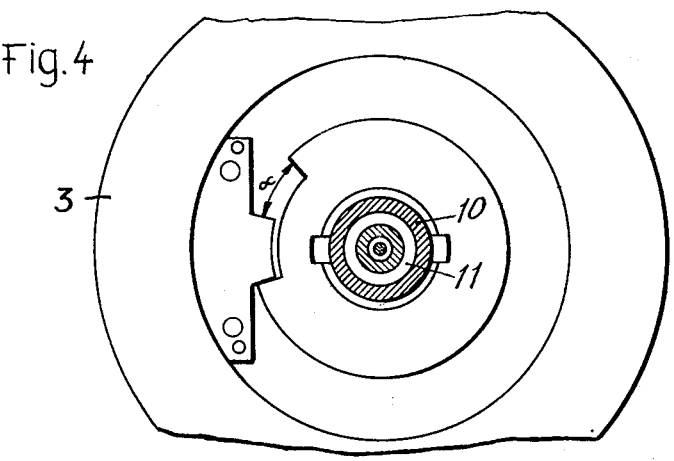
FIG. 4 is a horizontal section taken on the line 4—4 of FIG. 1.

The table 3 is provided with a larger diameter recessed portion at its lower end into which is fitted a torsion spring 12 having an upper end anchored in the table 3 and a lower end connected through a slot to a sleeve element 38. The sleeve element 38 is connected to bushing 10 through exterior teeth 40 formed at the lower end of the bushing 10 and engaged in slots extending longitudinally of member 38, and the force of the spring 12 tends to rotate the bushing 10. Rotation of sleeve 38 relative to table 3 is limited to an angle equal to the indexing angle α. As best seen in FIG. 4, this is effected by a plate secured to table 3 and having an arcuate abutment 17 on its inner surface engaged in an arcuate slot 18 in the external periphery of sleeve 38. The arcuate extent of slot 18 exceeds the arcuate extent of abutment 17 by an angular distance equal to the indexing angle α, so that reciprocation of sleeve 38, in either direction relative to table 3, is limited to an angular distance α.

The die press 30 also is provided with a ram 13 which carries the die presses (not shown). Means are provided in the operating machine to reciprocate a ram 13. The ram is provided with a hollow portion which receives a driving sleeve member 14 having an end face which is biased into contact with an end face of the sleeve member 10 by means of a compression spring 42. The spring 42 has a stronger compressive return force than the spring 11 disposed within the indexing sleeve member 10. During the down stroke or working stroke of the ram 13, the indexing sleeve 10 is pressed downwardly by the driving sleeve 14 and in FIG. 1 the bottom dead center position of the ram 13 is indicated. In this position, the indexing sleeve 10 is disengaged from the sleeve 4 which is coupled to the turret 1.

The indexing mechanism operates as follows:

As ram 13 reaches and passes the upper dead center of its reciprocating movement, and begins to move downwardly, the lower end face of member 14 engages the upper end of member 10. The compression spring 42 is substantially stronger than the compression spring 11. Consequently, as ram 13 continues its downward movement, spring 11 is compressed as member 10 is moved downwardly. At this time, the teeth 10' of member 10 are engaged with the helical teeth 4' of member 4 which is secured to the turret 1. Thus, as member 10 is moved downwardly by member 14, it tends to rotate member 4, and thus plate 1, in a counterclockwise direction as viewed in FIG. 3. However, rotation of member or sleeve 4 in a counterclockwise direction is inhibited by the engagement of the end 8 of pawl 7 with a radial side of a tooth 5. Consequently, bushing element or member 10 is rotated clockwise with respect to member 4.

Figure 6:
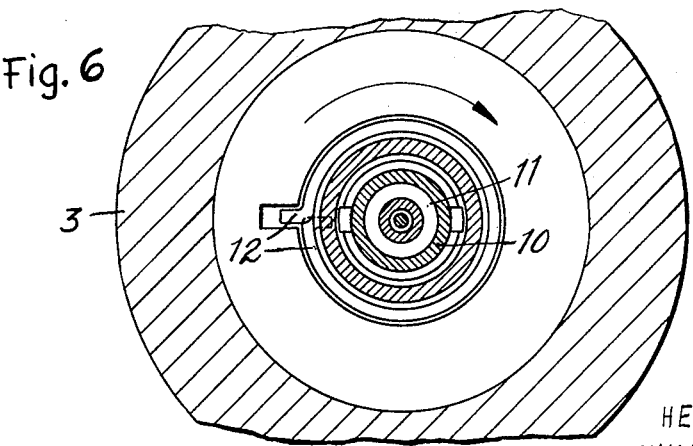
FIG. 6 is a horizontal section taken on the line 6—6 of FIG. 1.

It has been explained that the sleeve 38 is keyed to member 10 for rotation therewith, and this sleeve has one end of torsion spring 12 anchored thereto, as viewed in FIG. 6. The other end of torsion spring 12 is anchored in the table 3. This relative counterclockwise motion of member 10 and sleeve 38 thus tends to wind up or charge spring 12. After a predetermined downward movement of member 10 to the extent indicated in FIG. 1, the lower end of member 10 engages against the plate on the upper surface of base 34 so that further downward movement of member 10 is prevented. At this time, teeth 10' will have become disengaged from teeth 4'. Continued downward movement of ram 13 now compresses the spring 42 until such time as ram 13 reaches the lower dead center of its movement and starts its upward movement.

The pitch of the gear teeth 4' and 10' is equal to the indexing angle α through which the workpieces 2 are advanced between two working strokes. Both the pitch and the length of the gear teeth are so dimensioned that, during downward movement of ram 13, the member or ram 10 will be relatively rotated counterclockwise an amount substantially equal to the angle α, with the rotation limited by abutment 17. As teeth 10' disengage teeth 4', the charged spring 12 is released to turn bushing 38, and the bushing element 10 keyed thereto, relatively clockwise through substantially the angle α, and in a direction opposite to the direction of rotation of these parts during the previous portion of the downward movement of ram 13. The angular rotation is again limited by abutment 17. This occurs before ram 13 has completed its aforementioned downward movement during which the spring 12 is compressed.

As ram 13 reaches the dead center of its downward movement and starts upwardly, the spring 42 expands to its preset condition. Thereafter, as ram 13 continued its upward movement, the bushing element 10 can move upwardly under the force stored due to compression of the spring 11, with the upper end of member 10 being maintained in engagement with the lower end of plunger member 14. During the upward movement of member 10, the teeth 10' reengage the teeth 4' and this tends to rotate the member 4 and the turret 1 in a clockwise direction as viewed in FIG. 3, as member 38 is restrained against rotation by abutment 17 engaging the end of slot 18. Such relative clockwise movement of sleeve 4 and turret 1 is provided by the pawl 7, due to the inner inclined face of its end 8 sliding along the inclined flank of a tooth 5 and thus providing for "lifting" of pawl 7 out of engagement with a tooth 5 against the force of spring 9. The member 4 and turret 1 are thus rotated relatively clockwise through the angle α until shoulder 17 engages the opposite end of arcuate slot 18. At this time, the end 8 of pawl 7 will be aligned with the next adjacent space between teeth 5 of sleeve 4 and end 8 will be engaged into this space under the influence of the spring 9.

Movement of bushing 38 in a relatively clockwise direction under the influence of the unwinding of spring 12 is limited to the angle α due to engagement of the abutment 17 with an end of the arcuate groove or slot 18. Consequently, as member 10 reaches its upper position, the turret 1 and the sleeve 4 attached thereto have been advanced through the angle α so that the workpieces 2 have been advanced through a distance equal to the pitch of the teeth 5.

In the event of an incomplete partial rotation or inaccurate rotation of the indexing plate 1 so that the tool, the ram and the workpieces on the table are not precisely aligned, the pawl 6 operates an electric switch 16 when the teeth 8 of the pawl are out of engagement with the gear teeth 5. The switch 16 is effective to trip the driving mechanism. The ram 13 can only carry out its operating stroke if the ratchet device 6, 8 is properly engaged after each partial rotation of the indexing plate 1.

The entire indexing operation during the forward and return strokes of the ram 13 is indicated on an indexing chart in FIG. 7.

It should be appreciated that the invention is not restricted to its application to a multiple die press as described in the disclosed embodiment, but may be employed with any device which requires the indexing rotational movement of a part. It is particularly applicable for machines where working operations must be carried out upon workpieces in successive stages of advancement of the workpieces.

While a specific embodiment of the invention has been shown and described in detail to illustrate the application of the inventive principles, it will be understood that the invention may be embodied otherwise without departing from such principles.

What is claimed is:

1. In a machine tool having a reciprocable tool slide and a workpiece turret mounted for angular indexing in a direction transverse to the direction of reciprocation of the tool slide: turret indexing means comprising, in combination, a relatively fixed support mounting said turret for angular indexing; releasable latch means interconnecting said support and said turret and providing for relative rotation of said turret in one direction while inhibiting relative rotation of said turret in the opposite direction; a relatively elongated sleeve element secured coaxially to said turret for rotation therewith; a relatively elongated bushing element slidable in said sleeve element through a predetermined stroke; said sleeve element having internal, inclined formations extending from its end nearest said tool slide for less than the length of said sleeve element; said bushing element having external, inclined formations intermeshable with said internal formations and having a length so as to be intermeshed with the latter during only a portion of said stroke and disengaged from said internal formations during the remainder of said stroke; said formations having a length and inclination such that, during relative sliding of said elements with said formations intermeshed, said elements are rotated relatively to each other through substantially the indexing angle of said turret; abutment means coacting with said bushing element and said support and limiting relative oscillation of said bushing element to substantially said indexing angle; means biasing said bushing element outwardly of said sleeve element toward said ram in its retracted position, with said formations fully intermeshed; said ram, in its advance toward said turret, engaging said bushing element and moving the latter inwardly of said sleeve element; the inclination of said formations being oriented so that such inward movement of said bushing element tends to rotate the latter in said opposite direction, whereby said bushing element is rotated in said one direction until said formations are disengaged; and biasing means operatively connected to said support and said bushing element and charged by rotation of the latter in said opposite direction, said last-named biasing means, upon disengagement of said formations, rotating said bushing element in said one direction through its limit of oscillation as determined by said abutment means; said first-named biasing means, as said ram is retracted from said turret, moving said bushing outwardly of said sleeve element to reengage said formations whereby, due to said abutment means inhibiting further rotation of said bushing element in said one direction, said sleeve element is rotated in said one direction to advance said turret through the indexing angle.

2. Turret indexing means, as claimed in claim 1, in which said formations comprise helical splines on said sleeve element and said bushing element.

3. Turret indexing means, as claimed in claim 1, in which said releasable latch means comprises a spring biased pawl oscillatably mounted on said support and having an end interengageable with teeth on the external periphery of said sleeve, the pitch of said teeth being equal to said indexing angle.

4. Turret indexing means, as claimed in claim 1, in which said last-named biasing means comprises a torsion spring surrounding said bushing element and anchored thereto and to said support.

5. Turret indexing means, as claimed in claim 1, including a plunger slidably mounted in said ram and engageable with said bushing element; a first compression spring biasing said plunger to project from said ram into engagement with said bushing element; said first-named biasing means comprising a second compression spring; said first compression spring being stronger than said second compression spring and the stroke of said ram being longer than the stroke of said bushing element; whereby said plunger, during advance of said ram, will move said bushing element through the stroke of the latter and then will be moved into said ram, with compression of said first spring, while said ram continues its advance.

6. Turret indexing means, as claimed in claim 3, including a switch controlling operation of the machine tool; means biasing said switch to the open position; and means operable by said pawl, only when the latter is fully engaged with said teeth, to move said switch to the closed position; whereby said switch is opened until said turret is properly indexed.

7. Turret indexing means as claimed in claim 1, including a sleeve embracing said bushing and keyed thereto for sliding movement of said bushing element in said sleeve while inhibiting relative rotation of said bushing element and said sleeve; said sleeve being mounted in said support; said abutment means comprising an arcuate abutment and an arcuate slot interengaged with each other, one of said abutments and said slot being on said support and the other being on said sleeve, the arcuate lengths of said abutment and said slot differing by said indexing angle.

8. Turret indexing means, as claimed in claim 7, in which said last-named biasing means comprises a torsion spring embracing said sleeve.

References Cited by the Examiner
UNITED STATES PATENTS

| | | | |
|---|---|---|---|
| 2,636,393 | 4/53 | Josephs | 74—89 |
| 2,841,018 | 7/58 | Dickson | 74—89 X |
| 2,941,424 | 6/60 | Dixon | 74—88 X |
| 3,029,672 | 4/62 | Lowenborg | 74—128 X |
| 3,040,726 | 6/62 | Mayer | 74—89 X |
| 3,055,177 | 9/62 | Liston | 74—89 X |

BROUGHTON G. DURHAM, *Primary Examiner.*